United States Patent [19]

Gonzales

[11] 3,999,441
[45] Dec. 28, 1976

[54] PRESETTABLE SPEEDOMETER FOR AUTOMOTIVE VEHICLE

[75] Inventor: Boris Gonzales, Issy-les-Moulineaux, France

[73] Assignee: Societe Anonyme Automobiles Citroen, Paris, France

[22] Filed: June 17, 1975

[21] Appl. No.: 587,702

[30] Foreign Application Priority Data

June 20, 1974 France .................... 74.22545

[52] U.S. Cl. .................... 73/518; 73/519; 340/62; 340/263
[51] Int. Cl.[2] ............ G01P 3/49; G01P 3/50
[58] Field of Search ............ 73/519, 518; 340/53, 340/62, 263; 180/105 N, 105 E, 108, 110

[56] References Cited

UNITED STATES PATENTS

| | | | |
|---|---|---|---|
| 3,468,168 | 9/1969 | Colling | 73/519 |
| 3,490,295 | 1/1970 | Westby et al. | 73/518 |

*Primary Examiner*—James J. Gill
*Attorney, Agent, or Firm*—Karl F. Ross; Herbert Dubno

[57] ABSTRACT

A drum angularly entrained via a magnetic coupling by a shaft of a vehicular transmission, against a spring force, is linked via another magnetic coupling with a coaxial follower member carrying a printed circuit whose conductors are engageable by respective contact brushes normally spaced therefrom, the brushes acting as brakes upon being moved into contact with the conductors so as to arrest the follower member. An alarm device, which may emit a warning sound and/or carry out a control function, responds to a photoelectric sensor including a light emitter and a light receiver on the follower member coacting with a shutter on the drum, the sensor actuating the alarm device upon a relative displacement of the follower member and the drum beyond a selected relative angular position. A pushbutton, serving to bring the brushes into contact with the printed-circuit conductors, simultaneously connects the alarm device to its power supply.

8 Claims, 2 Drawing Figures

PRESETTABLE SPEEDOMETER FOR AUTOMOTIVE VEHICLE

This invention relates to a presettable speedometer for motor vehicles.

When a motor vehicle is traveling along a road subject to a speed restriction, the driver must frequently glance at the speedometer to check that the speed of the vehicle does not exceed the permitted limit. The driver's attention is thus diverted from the road which can be a danger to safety.

Speedometers are known which produce a warning or control signal when the vehicle reaches a given speed, either preselected or not.

In such a conventional speedometer, e.g. as known from U.S. Pat. No. 3,490,295, a speed-indicating member bearing suitable markings is rotatively entrainable by a transmission shaft against the force of a restoring spring through the intermediary of a yieldable coupling, specifically a magnetic clutch, against a spring force so as to assume an angular position varying with shaft speed, that speed being proportional to the velocity of the vehicle. A support, angularly adjustable about the axis of the speed-indicating member, carries a photoelectric device including a light emitter and a light receiver, this device co-operating with an opaque shutter or screen on the speed-indicating member which unblocks the light path between the emitter and the receiver upon rotation of the indicating member beyond a predetermined position relative to the support. The light then striking the receiver generates a signal which alerts the operator of the vehicle to the fact that the selected speed limit is being exceeded.

In order to use this speedometer, the support is rotated so that the maximum permitted speed is displayed. So long as the speed of the vehicle is lower than this preselected limit, the emitter and the receiver are separated from each other by the opaque part of the screen and no warning and/or control signal is produced, whereas at higher speeds light passes from the emitter to the receiver through the window in the screen, and a warning and/or control signal is produced.

In practice, however, the maximum permitted speed will vary with the nature of the road upon which the vehicle is traveling; for example, at the present time, this speed will vary in dependence upon whether the road in question is a turnpike, a highway, or an ordinary urban or suburban road.

With the known speedometer referred to above, the driver is frequently obliged to manually rotate the support of the opto-electronic device to change the setting in accordance with changes in the speed limit, which constitutes an inconvenience.

It is an object of the present invention to provide a speedometer which does not suffer from this inconvenience.

I realize this object, in accordance with my present invention, by the provision of a follower member rotatably centered on the axis of the speed-indicating member (referred to hereinafter as a drum) and entrainable thereby through another yieldable coupling such as a magnetic clutch. As long as the rotation of this follower member is substantially unrestrained, the two members are maintained in a predetermined relative angular position in which no signal is emitted by sensing means such as a photoelectric device and a shutter carried thereby. An actuating circuit for an associated alarm device, adapted to emit a warning sound and/or to carry out a control function, includes rotatable contact means on the follower member engageable by nonrotatable contact means whereby the follower member is arrested through the braking force developed therebetween, simultaneously with completion of the actuating circuit so as to make the alarm device receptive to a signal emitted by the sensing means whenever the speed-indicating member is displaced beyond the aforementioned relative angular position. The movement of the nonrotatable contact means into engagement with the rotatable contact means, under the control of presetting means such as a manually operable pushbutton, advantageously coincides with closure of a circuit breaker in an energizing circuit for the alarm device extending to a power supply which, therefore, is disconnected from that device as long as the follower member has not been preset.

The rotatable contact means preferably comprises a set of conductors forming part of a printed circuit carried by the follower member.

The invention will now be further described with reference to the accompanying drawing in which.

Figure 1:
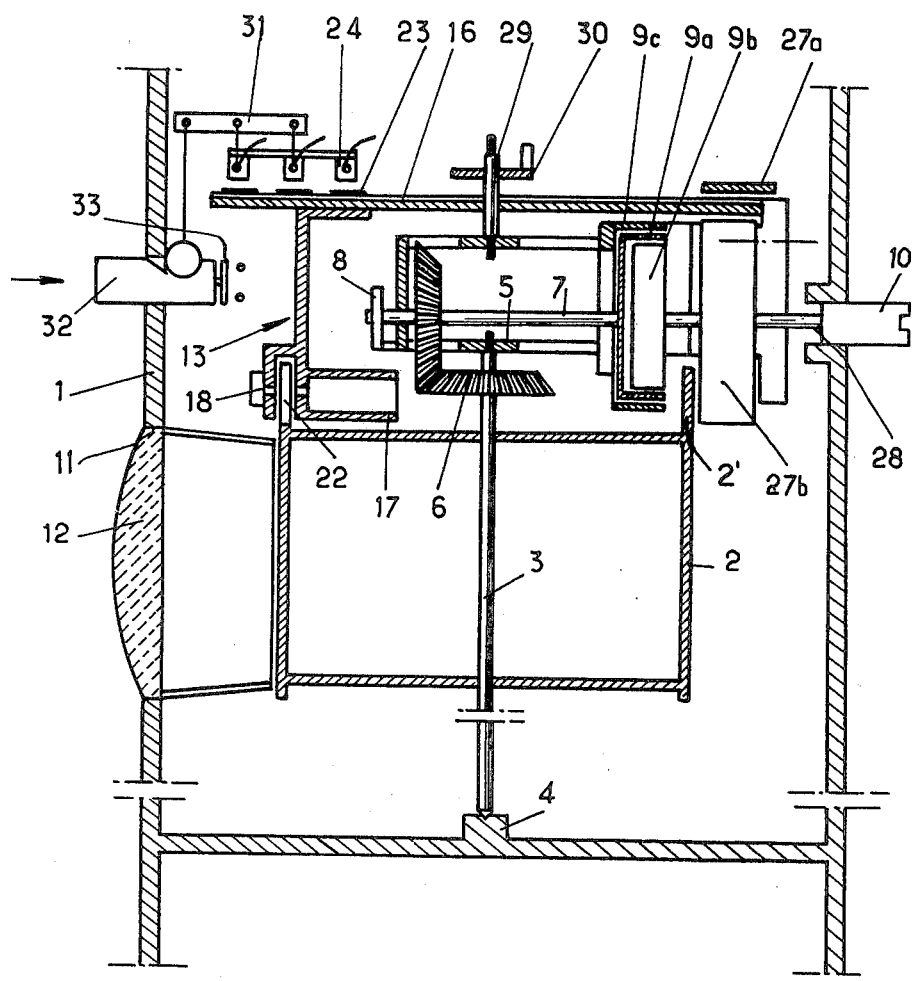
FIG. 1 is a side-sectional view of one embodiment of the invention.

In FIG. 1 of the drawing I have shown a speedometer for a motor vehicle comprising a casing 1 in which an opaque drum 2 is mounted for rotation, the drum 2 carrying speed indications on its peripheral surface; this drum 2 is rigidly connected to an axle 3 which is journaled at one end in a boss 4 integral with the casing 1 and at the other end is journaled in a wall 5 also fixed to the casing. The axle 3 is provided with a frustoconical pinion wheel 6 which meshes with a similar wheel carried by an axle 7 which is rotatable against the action of a return spring 8; the axle 7 is fixed to a cup-shaped member 9a of a conventional magnetic eddy-current coupling located between a magnet 9b, which is fixed on a shaft 28 integral with a connector 10, and a stationary armature ring 9c. Rotation of the magnet 9b angularly entrains the cup-shaped member 9a and the axle 7 against the action of a spring 8. The connector 10 is linked by a nonillustrated cable to the output shaft of the gearbox of the vehicle. The casing has an opening 11 in which is mounted a lens 12 through which the instantaneous vehicular speed can be read off.

When the vehicle is in motion, the connector 10 is set in rotation at a speed which is proportional to the speed of the vehicle. The axle 7 is thus also rotated against the action of the spring 8 through an angle which is proportional to the speed of the vehicle, the magnetic coupling 9a, 9b acting as a slipping clutch. The movement of the axle 7 is transmitted to the drum 2 which rotates through the same angle, the speed indication carried on the periphery of the drum being read through the lens 12.

A follower member 13, made of insulating material, is mounted to rotate about the axis of the drum shaft 3. This support is fixed to a plate 16 and carries a light emitter 17, for example in the form of a photo-emissive diode, and a light detector 18, constituted for example by a photodiode or phototransistor, confronting the emitter 17 across an intervening radial gap.

The drum 2 is provided with an axial flange 2' which extends into the gap between the emitter 17 and the detector 18. This flange, acting as a shutter to block the light path between the photoelectric sensing elements 17 and 18, is provided with an elongated window 22 through which a light beam from the emitter 17 can reach the detector 18. The leading edge of this window 22, as seen in the direction in which the drum rotates when the speed increases, is so arranged as to interpose itself between the emitter 17 and the detector 18 when the drum 2 overtakes the follower member 13 when the latter has been preset to a selected angular position, i.e. when the speed indicated by the drum 2 through the lens 12 has a desired predetermined value as, for example, one corresponding to a prescribed speed limit.

The emitter 17 and the detector 18 are connected to an electrical supply source and to a warning and/or control device, e.g. as described below with reference to FIG. 2, by means of a printed circuit 23, carried on the upper surface of the plate 16, and by brushes 24 which can contact the conductor of printed circuit 23 as will be described hereinafter. The elements of the circuit 23 are annular and arranged coaxially with the drum 2.

Figure 2:
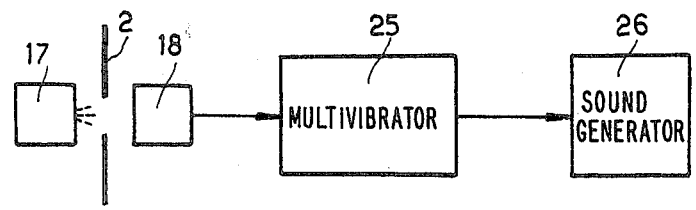
FIG. 2 is a diagram of an opto-electronic device and warning means for use in the embodiment of FIG. 1.

As shown in FIG. 2, the detector 18 is connected to a multivibrator 25 whose output feeds a sound generator 26. The latter thus provides a pulsed sound of a frequency equal to that of the multivibrator.

The plate 16 is electrically conductive and is insulated from the printed circuit 23; the plate is placed between a stationary armature plate 27a and a magnet 27b which, like the magnet 9b, is fixed on the shaft 28 which is secured to the connector 10 and magnetically coupled to the axle 7.

The plate 16 is rigid with a pivot pin 29 and is subject to the action of a return spring 30. The plate 16 thus tends to rotate through an angle which is a function of the speed of rotation of the shaft 28 and the spring 30 allows the angle of rotation of the plate 16 to equal that of the drum 2 as long as the swing of the plate is not restrained. The front edge of the window 22 when at rest lies in the path connecting the emitter 17 and the detector 18, thus obstructing the transmission of light therebetween.

The brushes 24, which in contradistinction to the rotatable conductors 23 may be referred to as nonrotatable contact means, are carried by a movable support 31 which is controlled by a pushbutton 32 with preset positions, and the brushes can thus either be brought into contact with the printed circuit 23 or be maintained at a distance from this circuit. The button 32 also actuates a contact 33 located in the electrical supply circuit of the warning device 25, 26.

When the button 32 is not depressed, the contact 33 acts as a circuit breaker disconnecting the alarm means 25, 26 from the power supply and the brushes 24 are spaced from the printed circuit 23. The warning device is thus inoperative and the follower member or sensor support 13 rotates at the same time as the drum 2 through the same angle as the latter.

When the predetermined (maximum permissible) speed V is reached, the driver depresses the button 32. The warning device is then actuated and the brushes 24 engage the conductors 23 whereby, on the one hand, the emitter 17 and the detector 18 are connected to the warning device and, on the other hand, the support 13 is immobilized by the braking action exerted by the brushes upon those conductors.

Thus, if the speed of the vehicle exceeds the speed V, the warning device is actuated by a signal from detector 18 and remains in operation as long as the speed of the vehicle does not fall below the value V.

When a change in the maximum speed is desired, it is only necessary to again depress the button 32 so as to withdraw the brushes 24 and to cut off the electrical supply to the warning device. The support 13 rotates and is brought either by the spring 30 either into its home position, if the vehicle is at rest, or into some other angular position corresponding to that of the drum 2.

Although a particular preferred embodiment of the invention has been described for illustrative purposes, it will be understood that various changes and modifications may be made thereto without departing from the scope and spirit of my invention as defined in the appended claims.

What I claim as my invention and desire to secure by Letters Patent of the United States is:

1. A speedometer for an automotive vehicle provided with a transmission shaft rotating at a speed proportional to the speed of the vehicle, comprising:

a speed-indicating member rotatable about an axis;

first yieldable coupling means linking said speed-indicating member with said shaft for rotary entrainment thereby;

spring means anchored to said speed-indicating member for resisting the rotation thereof whereby said speed-indicating member is entrained by said shaft into an angular position varying with vehicular speed;

a follower member rotatably centered on said axis;

second yieldable coupling means linking said follower member with said transmission shaft for rotary entrainment thereby in the absence of a substantial restraining force acting upon said follower member;

sensing means on said members adapted to emit a signal upon displacement of said speed-indicating member beyond a predetermined relative angular position in which said members are maintained by said second coupling means in the absence of said restraining force;

alarm means responsive to said signal for alerting the operator of the vehicle to an excessive vehicular speed, said alarm means being provided with an actuating circuit extending to said sensing means;

coacting rotatable and nonrotatable contact means in said actuating circuit, said rotatable contact means being mounted on said follower member, said nonrotatable contact means being engageable with said rotatable contact means for completing said actuating circuit; and presetting means operable at a selected vehicular speed to engage said nonrotatable contact means with said rotatable contact means, thereby arresting said follower member in an angular position corresponding to the selected speed while making said alarm means receptive to said signal.

2. A speedometer as defined in claim 1 wherein said sensing means comprises a photoelectric device on one of said members and a shutter on the other of said members, said shutter having a window with an edge defining said predetermined relative angular position.

3. A speedometer as defined in claim 2 wherein said photoelectric device comprises a light emitter and a light receiver separated by a radial gap, said shutter being a flange entering said radial gap.

4. A speedometer as defined in claim 3 wherein said speed-indicating member is a drum, said shutter being an axially extending flange on said drum.

5. A speedometer as defined in claim 1 wherein said first and second yieldable coupling means comprise magnetic clutches.

6. A speedometer as defined in claim 1 wherein said alarm means is provided with an energizing circuit extending to a power supply, said energizing circuit including a circuit breaker closable by said presetting means upon engagement of said nonrotatable contact means with said rotatable contact means.

7. A speedometer as defined in claim 6 wherein said presetting means comprises a manually operable push-button.

8. A speedometer as defined in claim 1 wherein said rotatable contact means forms part of a printed circuit carried by said follower member.

* * * * *